United States Patent [19]
Fujie et al.

[11] Patent Number: 5,293,824
[45] Date of Patent: Mar. 15, 1994

[54] GROUND COIL FOR MAGNETICALLY LEVITATED RAILWAY

[75] Inventors: Junji Fujie, Hino; Hisamitsu Shibakawa, Toda, both of Japan

[73] Assignee: Railway Technical Research Institute, Japan

[21] Appl. No.: 990,347

[22] Filed: Dec. 14, 1992

[30] Foreign Application Priority Data

Feb. 6, 1992 [JP] Japan ................................. 4-056398

[51] Int. Cl.$^5$ ............................................. H01F 5/00
[52] U.S. Cl. ................................... 104/282; 104/286
[58] Field of Search ............... 104/281, 282, 286, 290; 505/902, 903, 904, 905

[56] References Cited

U.S. PATENT DOCUMENTS 4,913,059 4/1990 Fujie et al. ........................... 104/282

Primary Examiner—Mark T. Le
Attorney, Agent, or Firm—Lorusso & Loud

[57] ABSTRACT

Ground coils for a magnetically levitated railway include non-flux coils with an upper coil having a main-winding portion and an intermediate terminal forming a shunt-winding portion of the main-winding portion. A lower coil having a main-winding portion and an intermediate terminal forming a shunt-winding portion of the main-winding portion. The upper coil and the lower coils are arranged one above the other and are null-flux connected at null-flux connection points. A first lead terminal is connected to one null-flux connection point and a second lead terminal is connected to the intermediate terminal of the upper coil and the intermediate terminal of the lower coil for connecting to a power source and/or for interconnecting coils on left and right sides to provide guidance forces to the superconducting coils on the vehicle.

2 Claims, 12 Drawing Sheets

GROUND COIL FOR MAGNETICALLY LEVITATED RAILWAY

BACKGROUND OF THE INVENTION

This invention relates to a ground coil used in a so-called ground primary-type magentically levitated railway in which a vehicle is equipped with superconducting coils.

In a so-called ground primary-type magentically levitated railway in which a vehicle is equipped with superconducting coils, use is being made of a side-wall levitation-guidance system in which the left and right side walls of a guideway are equipped with conductor coils for levitation, and corresponding locations of the left and right ground coils are connected by null-flux wiring. Also being used is a side-wall propulsion-levitation-guidance system in which wiring for propulsion is connected to terminals for the null-flux wiring.

Such a side-wall levitation-guidance system and the side-wall propulsion-levitation-guidance system have already been proposed as U.S. Pat. No. 4,913,059 by the inventors of the present invention.

Ground coils of the side-wall levitation-guidance type according to the prior art will now be described with FIGS. 1 through 4.

Conductor coils 14, 14' for propulsion are arranged in opposed relation on both inner side walls of a U-shaped track bed 9 at predetermined intervals along the direction in which the vehicle travels. As shown in FIG. 2, a three-phase propulsion power supply 20 (a polyphase motor of more than three phases can be employed if desired) is connected to the conductor coils 14, 14' for propulsion. Though the propulsion conductor coil 14' disposed on the nearer side wall of the track bed is deleted from FIG. 2, the propulsion conductor coil 14' is disposed on the nearer side wall of the track bed in the same manner as the propulsion conductor coil 14, and a propulsion power supply 20' is connected to it in the same fashion. Conductor coils 15, 15' for levitation and guidance are disposed in opposed relation on the sides of the propulsion conductor coils 14, 14' facing the superconducting coils 1, 1' and are arranged at predetermined intervals continuously along the direction in which the vehicle travels. Each conductor coil 15 comprises a null-flux connected upper coil 16 and lower coil 17 of the same shape and dimensions, and each conductor coil 15' comprises a null-flux connected upper coil 16' and lower coil 17' of the same shape and dimensions. These opposing conductor coils 15, 15' for levitation and guidance in turn are null-flux connected via connecting wires 18, 19.

The design is such that when the vehicle VH has its auxiliary wheels 7, 7' in contact with the track bed, the vertical midpoints of the superconducting coils 1, 1', the vertical midpoints of the levitation and guidance conductor coils 15, 15' and the vertical midpoints of the propulsion conductor coils 14, 14' lie on the same horizontal line. The upper coils 16, 16' and lower coils 17, 17' of the levitation and guidance conductor coils 15, 15' are vertically symmetrically positioned about respective predetermined points on the horizontal line. Further, numeral 4 denotes the truck of the vehicle VH, and numerals 5, 5' designate mechanical guiding wheels rotatably supported on one end of respective shafts 6, 6' the other ends of which are secured to the vehicle VH.

The arrangement described above is such that in response to introduction of power from the propulsion power supply 20, currents having the same direction as shown in FIG. 2 flow into the propulsion conductor coil 14 so that a propulsive force is produced by each of the vertical segments.

When the vehicle VH is running with its auxiliary wheels 7, 7' in contact with the track bed, the linkage flux developed by the conductor coils 15, 15' for levitation and guidance is zero, the current is zero and the electromagnetic resistance is zero. The reason for this is that the positional relationship between the superconducting coils 1, 1' and conductor coils 15, 15' for levitation and guidance is designed as set forth above, while the upper coil 16 and lower coil 17 are null-flux connected, as well as the upper coil 16' and lower coil 17'.

When the vehicle VH is running while levitated with its wheels 7, 7' raised, the vertical midpoints of the superconducting coils 1, 1' drop below the vertical midpoints of the conductor coils 15, 15' for levitation and guidance, as a result of which a difference is produced in the linkage magnetic flux between the upper coil 16' and lower coil 17'. At such time, currents as shown in FIG. 3 are induced in the upper coil 16 and lower coil 17 and in the upper coil 16' and lower coil 17'. In consequence, an attractive force acts between horizontal segments 16a, 16'a of the two upper coils 16, 16' and the upper horizontal segments of the superconducting coils 1, 1', while a repulsive force acts between horizontal segments 17a, 17'a of the two lower coils 17, 17' and the lower horizontal segments of the superconducting coils 1, 1'. Owing to these repulsive and attractive forces, a levitating force is produced that attempts to return the superconducting coils 1, 1' in the upward direction, with the coils 1, 1' attaining stability at a position where the weight of the vehicle vH is counterbalanced. Since the upper coil 16 and lower coil 17 as well as the upper coil 16' and lower coil 17' generate the levitating force effectively with little current, there is little electromagnetic traveling resistance.

The superconducting coils 1, 1' are arranged symmetrically with respect to the longitudinal center line of the track bed 9, and the opposing upper coils 16, 16' and opposing lower coils 17, 17' are null-flux connected via the connecting wires 18, 19. Therefore, when the vehicle VH is situated in the middle of the track bed, the linkage flux does not become zero even though there is no lateral displacement of the vehicle VH in the levitated state. However, since the linkage fluxes of the conductor coils 15, 15' for levitation and guidance are equal, currents do not flow through the connecting wires 18, 19. As a result, no lateral force is produced.

If the vehicle VH shown in FIG. 1 is displaced leftward, for example, during levitated travel, a difference develops in the linkage flux between the upper coils 16, 16' and between the lower coils 17, 17'. When the superconducting coils 1, 1' cope with this change in the linkage flux, currents as shown in FIG. 4 are induced in the levitation and guidance coils 15, 15', whereby a guidance force is produced that restores the superconducting coils 1, 1' to the middle of the track. In other words, repulsive forces act between the horizontal segment 16a of the upper coil 16 and the upper horizontal segment of superconducting coil 1, and between the horizontal segment 17a of the lower coil 17 and the lower horizontal segment of superconducting coil 1, while attractive forces act between the horizontal segment 16a' of upper coil 16' and the upper horizontal segment of superconducting coil 1', and between the horizontal segment 17'a of lower coil 17a and the lower horizontal segment of superconducting coil 1'. These forces restore the superconducting coils 1, 1' to the middle of the track.

Next, a conventional ground coil of the side-wall propulsion-levitation-guidance type will now be described with reference to FIGS. 5, 6(a), 6(b) and 6(c).

In comparison with the ground coil of the side-wall levitation-guidance type described above, this example differs mainly in that conductor coils corresponding to the propulsion conductor coils 14, 14' in the aforementioned side-wall levitation-guidance system are not provided, and in that conductor coils having the same construction as the levitation and guidance conductor coils 15, 15' of the levitation-guidance-conductor coils 15, 15' in the aforementioned side-wall levitation-guidance system are made to perform the functions of levitation, propulsion and guidance.

As shown in FIG. 5, conductor coils 21, 21' are disposed in opposed relation on both inner side walls of the U-shaped track bed 9 and are arranged at predetermined intervals continuously along the direction in which the vehicle travels. This structure is similar to that of the levitation and guidance conductor coils 15, 15' in the side-wall levitation-guidance system. That is, the conductor coil 21 (21') comprising a null-flux connected upper coil 22 (22') and lower coil 23 (23') having the same shape and dimensions, and the opposing conductor coils 21, 21' on both inner side walls of the U-shaped track bed 9 are null-flux connected. When the vehicle VH is in contact with the ground via its auxiliary wheels 7, 7', the vertical midpoint of the conductor coil 21 and the vertical midpoint of the superconducting coil 1 lie on the same horizontal line, and the upper coil 22 and lower coil 23 are disposed symmetrically about a predetermined point on this horizontal line. The conductor coil 21' also has exactly the same structure and arrangement as the conductor coil 21. In addition, the upper coil 22' corresponds to the upper coil 22, and the lower coil 23' corresponds to the lower coil 23.

A three-phase power supply (or a polyphase power supply of more than three phases) 26 for propulsion is connected to connecting wires 24, 25 which null-flux connect the opposing conductor coils 21, 21'. In a case where a three-phase power supply is used as the propulsion power supply, the arrangement is such that the phases are connected successively to every third conductor coil.

By introducing power from the propulsion power supply 26 to the above-described arrangement, a current for propulsion flows through the conductor coil 21 via a node 27 of connecting line 24 from a to a node 27' through b, c and d, and from e to the node 27' through f, g and h, and a current for propulsion flows through the conductor coil 21' via the node 27' from a' to the node 27' through b', c' and d' and from e' to the node 27' through f', g' and h', as shown in FIG. 6(a). Currents having the same direction, which is indicated by the arrows, flow through each of the coils 22, 23, 22', 23'. A propulsion force is produced by the generation of an electromagnetic flux in the forward direction of the vehicle VH between the vertical segments of the conductor coils 21, 21', namely the segments a-b, c-d, e-f, g-h, a'-b', c'-d', e'-f', g'-h', and the vertical segments of the superconducting coils 1,1'.

Meanwhile, forces for levitation and guidance are generated in the same manner as described above in conjunction with FIGS. 3 and 4. This will be explained again with reference to FIGS. 6(b) and 6(c).

When the vehicle VH is running on its wheels 7, 7', the linkage flux developed by the conductor coils 21, 21' for levitation and guidance is zero, the current is zero and the electromagnetic resistance is zero. The reason for this is that the positional relationship between the superconducting coils 1, 1' and conductor coils 21, 21' is designed as set forth above, while the upper coil 22 and lower coil 23 are null-flux connected, as well as the upper coil 22' and lower coil 23'. When the vehicle VH is running while levitated, the vertical midpoints of the superconducting coils 1, 1' drop below the vertical midpoints of the conductor coils 21, 21', as a result of which a difference is produced in the linkage magnetic flux between upper coil 22 and lower coil 23 and between upper coil 22' and lower coil 23'. Currents as shown in FIG. 6(b) are induced in the upper coils 22, 22' and lower coils 23, 23'. Owing to repulsive and attractive forces between horizontal segments of the coils 22, 23, 22', 23', a levitating force is produced that attempts to return the superconducting coils 1, 1' in the upward direction, with the coils 1, 1' attaining stability at a position where the weight of the vehicle VH is counterbalanced, in a manner the same as that set forth above.

The superconducting coils 1, 1' are arranged symmetrically with respect to the longitudinal center line of the track bed 9, and the opposing upper coils 22, 22' and opposing lower coils 23, 23' are null-flux connected via the connecting wires 24, 25. Therefore, when the vehicle VH is situated in the middle of the track bed 9, the linkage flux does not become zero even though there is no lateral displacement of the vehicle VH in the levitated state. However, since the linkage fluxes of the conductor coils 21, 21' are equal, currents do not flow through the connecting wires 24, 25. As a result, no lateral force is produced.

If the vehicle VH shown in FIG. 5 is displaced leftward, for example, during levitated travel, a difference develops in the linkage flux between the superconducting coils 1, 1' and the upper coils 22, 22' and between the superconducting coils 1, 1' and the lower coils 23, 23'. As a result, currents as shown in FIG. 6(c) are induced, whereby a guidance force is produced that the restores the superconducting coils 1, 1' to the middle of the track in the manner described above.

In the examples described above, a track bed having a U-shaped cross section is used as the track bed 9. However, it is possible to employ a track bed having a projecting-type cross section.

Specifically, as shown in FIG. 7, superconducting coils 31, 31' are vertically mounted on both inner side surfaces of a generally box-shaped truck 30 of the vehicle VH, and conductor coils 32, 32' for performing levitation, propulsion and guidance functions, as described above in conjunction with the side-wall propulsion-levitation-guidance system, are arranged on both side walls of a projecting track bed 38 so as to be capable of electromagnetically coupling with the superconducting coils 31, 31'. The conductor coil 32 has upper and lower coils 33, 34, respectively, and the conductor coil 32' has upper and lower coils 33', 34', respectively. The conductor coils 32, 32' are connected by connecting wires 39, 40. Auxiliary wheels 37, 37' are raised when the vehicle VH is running while levitated. When vehicle speed drops below a certain level, the auxiliary wheels 37, 37' are extended from the vehicle VH and make contact with the track bed 38. Mechanical guidance wheels 35, 35' are rotatably mounted on the ends of respective shafts 36, 36' whose other ends are fixedly secured to the vehicle VH. These wheels 35, 35' are deployed and guide the vehicle VH mechanically while rolling along the side walls of the projecting track bed 38 when the vehicle VH is running on its wheels 37, 37'.

When a vehicle of extended length that allows an increase in passenger capacity is introduced in order to increase the transportation capacity of the magnetically levitated railway, it is necessary to take into consideration the fact that the levitating force of the magnetically levitated vehicle should be increased in comparison with that of a shorter vehicle having a smaller passenger capacity. It is also necessary to take into account the fact that when the magnetically levitated vehicle is traveling on a curved section of the railway, the guiding force should be increased in comparison with that needed when the vehicle is traveling on a straight section of the railway. Still another consideration is that when the vehicle is traveling on an upgrade section of the railway or on a section located in a tunnel, the propulsive force should be increased in comparison with that needed when the vehicle is traveling on a flat section of the railway or on sections located outside tunnels.

However, in the case of a ground coil in the conventional side-wall levitation-guidance system or side-wall propulsion-levitation-guidance system described above, the characteristics thereof are decided by the fact that the design factors of levitating force and guiding force are mutually restrictive in the side-wall levitation-guidance system and the design factors of propulsive force, levitating force and guiding force are mutually restrictive in the side-wall propulsion-levitation-guidance system owing to such design requirements as the number of windings of the conductor coils, the shape of the coils and the characteristics of the coils. In other words, the problem is that levitating force and guiding force in the former system, and propulsive force, levitating force and guiding force in the latter system, cannot be designed independently of each other.

Accordingly, when the levitating force is raised in the side-wall levitation-guidance system, the guiding force also is strengthened. When the levitating force is raised in the side-wall propulsion-levitation-guidance system, the propulsive force and guiding force also rise since these forces are linked to the guiding force.

In a case where the levitating force is raised, it is necessary to increase the ampere turns of the side-wall conductor coils for levitation. When the ampere turns of the side-wall conductor coils for levitation are increased, the voltage of the null-flux wiring for obtaining the guiding force rises. This increased voltage cannot be accommodated by low-voltage electric wires.

An object of the present invention is to provide ground coils for a magnetically levitated railway capable of smooth operation conforming to railway traveling conditions and vehicle conditions in which it is possible to obtain a levitating force suited to an increase in the weight of the vehicle body of a vehicle of extended length, a guiding force suited to curved sections of the railway and a propulsive force suited to tunnel sections and upgrade sections of the railway, this being achieved by designing propulsive force, levitating force and guiding force independently of one another.

SUMMARY OF THE INVENTION

According to the present invention, the foregoing object is attained by providing ground coils for a magnetically levitated railway in which superconducting coils are mounted on a vehicle and ground coils are arranged on left and right sides of a guideway for moving the vehicle by repulsion induced between the superconducting coils and the ground coils, wherein the ground coils are used in one-set units and comprise a propulsion coil and a levitation-guidance coil disposed separately of the propulsion coil and arranged on the left and right sides of the guideway, the levitation-guidance coil including an upper coil having a levitation main-winding portion and an intermediate terminal forming a guidance shunt-winding portion branching from the levitation main-winding portion; a lower coil having a levitation main-winding portion and an intermediate terminal forming a guidance shunt-winding portion branching from the levitation main-winding portion, the upper coil and the lower coil being arranged one above the other and being null-flux connected at null-flux connection points; a first lead terminal led out from one null-flux connection point; a second lead terminal lead out from the intermediate terminal of the upper coil and the intermediate terminal of the lower coil; a first null-flux wiring line connecting the first lead terminals of the levitation-guidance coils arranged on the left and right sides of the guideway; and a second null-flux wiring line connecting the second lead terminals of the levitation-guidance coils arranged on the left and right sides of the guideway.

In a preferred embodiment, the ground coils include a propulsion-levitation-guidance coil arranged on the left and right sides of the guideway, the propulsion-levitation-guidance coil including an upper coil having a main-winding portion and an intermediate terminal forming a shunt-winding portion branching from the main-winding portion; a lower coil having a main-winding portion and an intermediate terminal forming a shunt-winding portion branching from the main-winding portion, the upper coil and the lower coil being arranged one above the other and being null-flux connected at null-flux connection points; a first lead terminal led out from one null-flux connection point; a second lead terminal lead out from the intermediate terminal of the upper coil and the intermediate terminal of the lower coil; a first null-flux wiring line connecting the first lead terminals of the ground coils arranged on the left and right sides of the guideway; and a second null-flux wiring line connecting the second lead terminals of the ground coils arranged on the left and right sides of the guideway.

The number of windings of the ground coils used for levitating force, propulsive force and guiding force may be selected at will to provide ground coils conforming to railway and vehicle conditions. It is possible to isolate design elements of levitating force and guiding force or propulsive force, levitating force and guiding force. The levitating force is produced utilizing the total number of windings of the levitating coils on the side walls, and the propulsive force and/or guiding force can be less than the levitating force by the shunt-winding portions.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

Embodiments of the present invention will now be described in detail with reference to the drawings.

A first embodiment of the invention will be described with reference to FIGS. 8 through 11.

Figure 9:
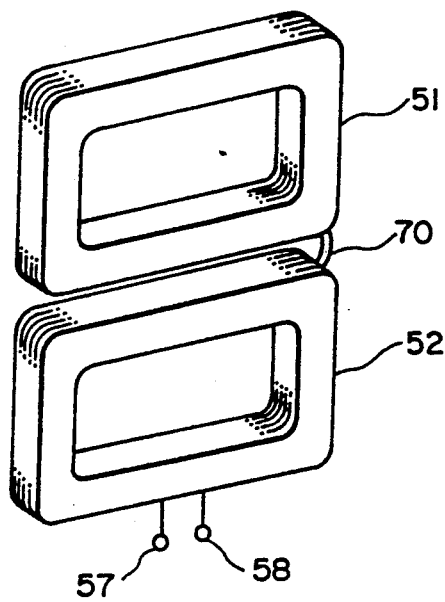
FIG. 9 is a diagram illustrating upper and lower coils of a ground coil for a magnetically levitated railway according to the first embodiment of the present invention.

An upper coil 51 and a lower coil 52 construct part of a ground coil for a magnetically levitated railway. The upper coil 51 is provided with a levitating main-winding portion 51m of the upper coil 51 and an intermediate terminal 53 forming a guiding shunt-winding portion 51s branching from the levitating main-winding portion 51m. The lower coil 52 is provided with a levitating main-winding portion 52m of the lower coil and an intermediate terminal 55 forming a guiding shunt-winding portion 52s branching from the levitating main 5 winding portion 52m. Further, as shown in FIG. 9, the upper coil 51 and lower coil 52 are arranged one above the other and are null-flux connected. They are provided with a first lead terminal 57 led out from the null-flux connection point and a second lead terminal 58 lead out from the intermediate terminals 53 and 55.

Figure 11:
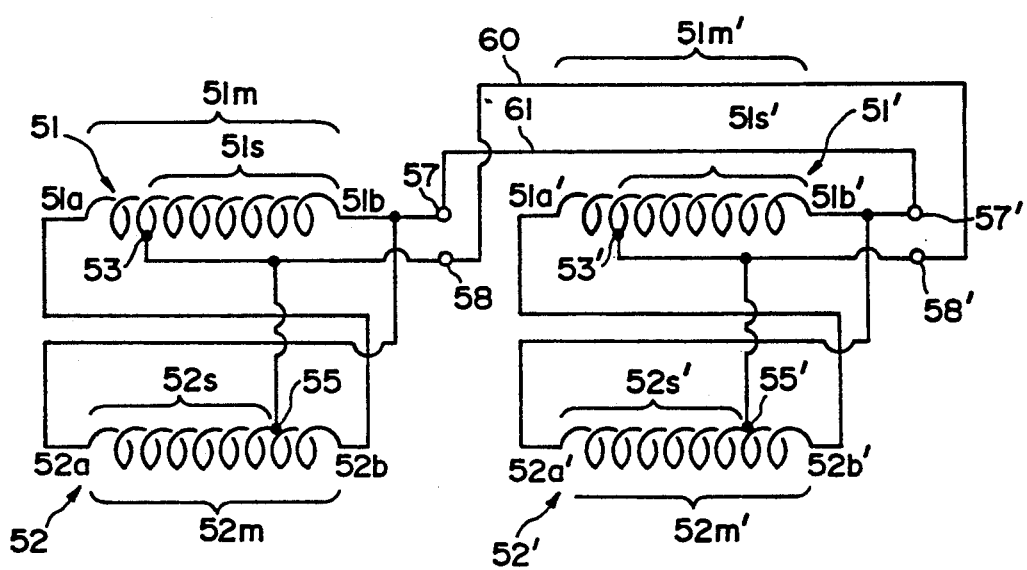
FIG. 11 is a circuit diagram of ground coils for a magnetically levitated railway according to the first embodiment of the present invention.

An identically constructed ground coil is arranged also on the opposite side of the track bed. More specifically, as illustrated in FIG. 11, an upper coil 51' and a lower coil 52' are provided. The upper coil 51' is provided with a levitating main-winding portion 51m' of the upper coil and an intermediate terminal 53' forming a guiding shunt-winding portion 51s' branching from the levitating main-winding portion 51m'. The lower coil 52' is provided with a levitating main-winding portion 52m' of the lower coil and an intermediate terminal 55' forming a guiding shunt-winding portion 52s' branching from the levitating main-winding portion 52m'. Further, the upper coil 51' and lower coil 52' are arranged one above the other and are null-flux connected. They are provided with a first lead terminal 57' led out from the null-flux connection point and a second lead terminal 58' lead out from the intermediate terminals 53' and 55'.

The first lead terminals 57 and 57' are connected by a first null-flux wiring line 61, and the second lead terminals 58 and 58' are connected by a second null-flux wiring line 60.

Owing to this arrangement, a levitating force is produced by induction currents, which are induced by superconducting coils (not shown) mounted on the vehicle, in a closed circuit comprising one end portion 51a of the upper coil 51, the levitating main-winding portion 51m, the other end portion 51b of the upper coil 51, one end portion 52a of the lower coil 52, the levitating main-winding portion 52m and the other end portion 52b of the lower coil 52 on the side of one ground coil, and in a closed circuit comprising one end portion 51a' of the upper coil 51', the levitating main-winding portion 51m', the other end portion 51b' of the upper coil 51', one end portion 52a' of the lower coil 52', the levitating main-winding portion 52m' and the other end portion 52b' of the lower coil 52' on the side of opposing ground coil.

A guiding force is produced by induction currents generated in a closed circuit comprising the second lead terminal 58, the intermediate terminal 53, the guiding shunt-winding portion 51s, the other end 51b of the upper coil 51, the first lead terminal 57, the first null-flux wiring line 61, the first lead terminal 57', the other end portion 51b of the upper coil 51', the guiding shunt-winding portion 51s', the intermediate coil 53', the second lead terminal 58', the second null-flux wiring line 60 and the second lead terminal 58, and in a closed circuit comprising the second lead terminal 58, the intermediate terminal 55, the guiding shunt-winding portion 52s, the other end 52a of the lower coil 52, the first lead terminal 57, the first null-flux wiring line 61, the first lead terminal 57', one end portion 52a' of the lower coil 52', the guiding shunt-winding portion 52s', the intermediate coil 55', the second lead terminal 58', the second null-flux wiring line 60 and the second lead terminal 58.

As described above, the levitating force uses the total number of windings of the upper and lower coils, and therefore a large levitating force can be produced. The guiding force, on the other hand, uses the shunt windings led out from the intermediate terminals of the winding portions of the upper and lower coils. Consequently, the number of windings of the upper and lower coils is reduced, so that the guiding force is reduced as compared with the levitating force.

As a result, an arrangement can be realized in which the guiding force is suppressed even though the levitating force is increased.

Figure 1:
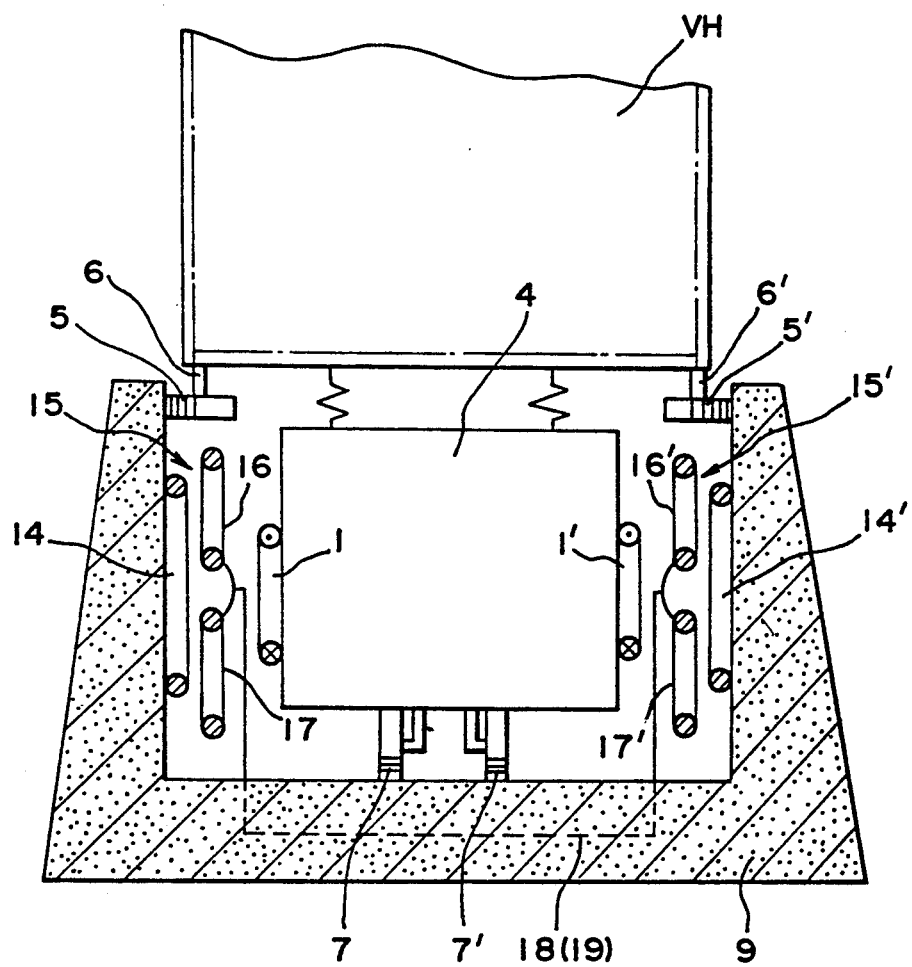
FIG. 1 is a sectional view showing a side-wall levitation-guidance type magnetically levitated railway according to the prior art.
Figure 2:
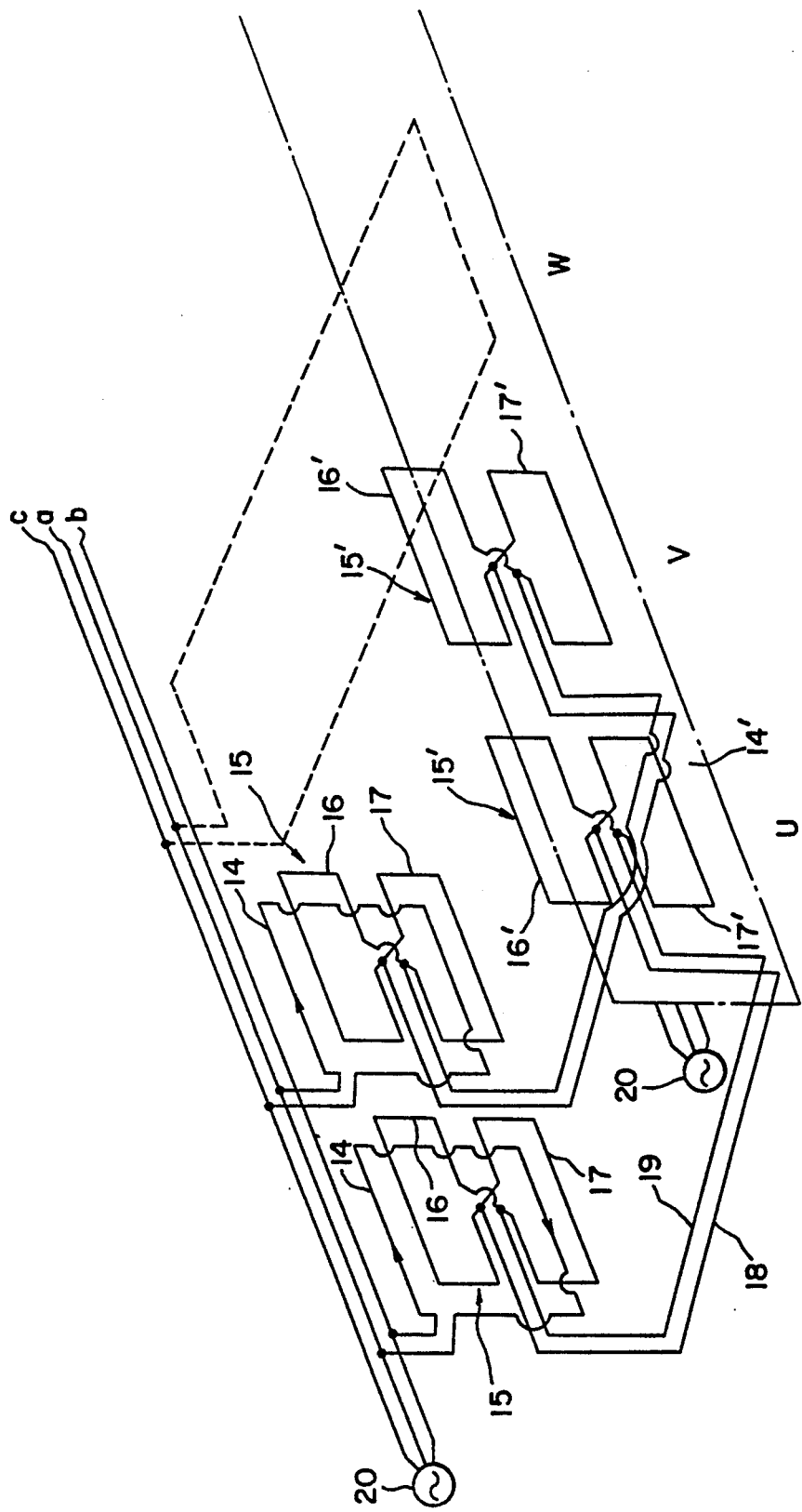
FIG. 2 is a circuit diagram showing the circuit arrangement of conductor coils for propulsion and conductor coils for levitation and guidance in FIG. 1.
Figure 3:
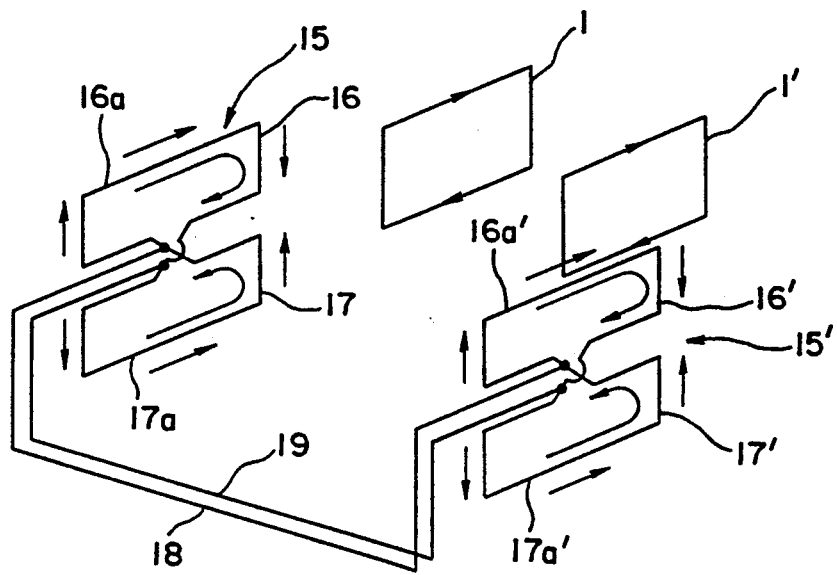
FIG. 3 is a circuit diagram for describing the levitating action of the conductor coils for levitation and guidance shown in FIG. 1.
Figure 4:
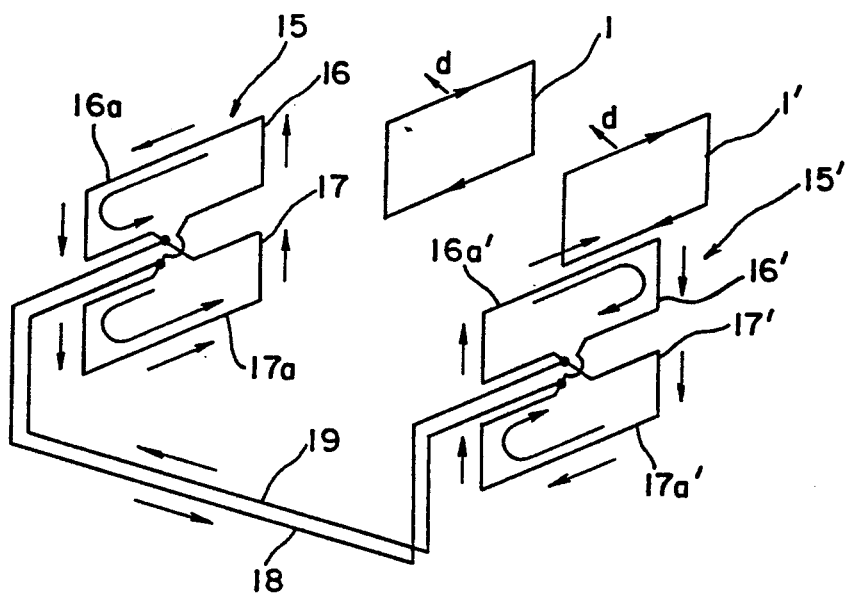
FIG. 4 is a circuit diagram for describing the guiding action of the conductor coils for levitation and guidance shown in FIG. 1.
Figure 5:
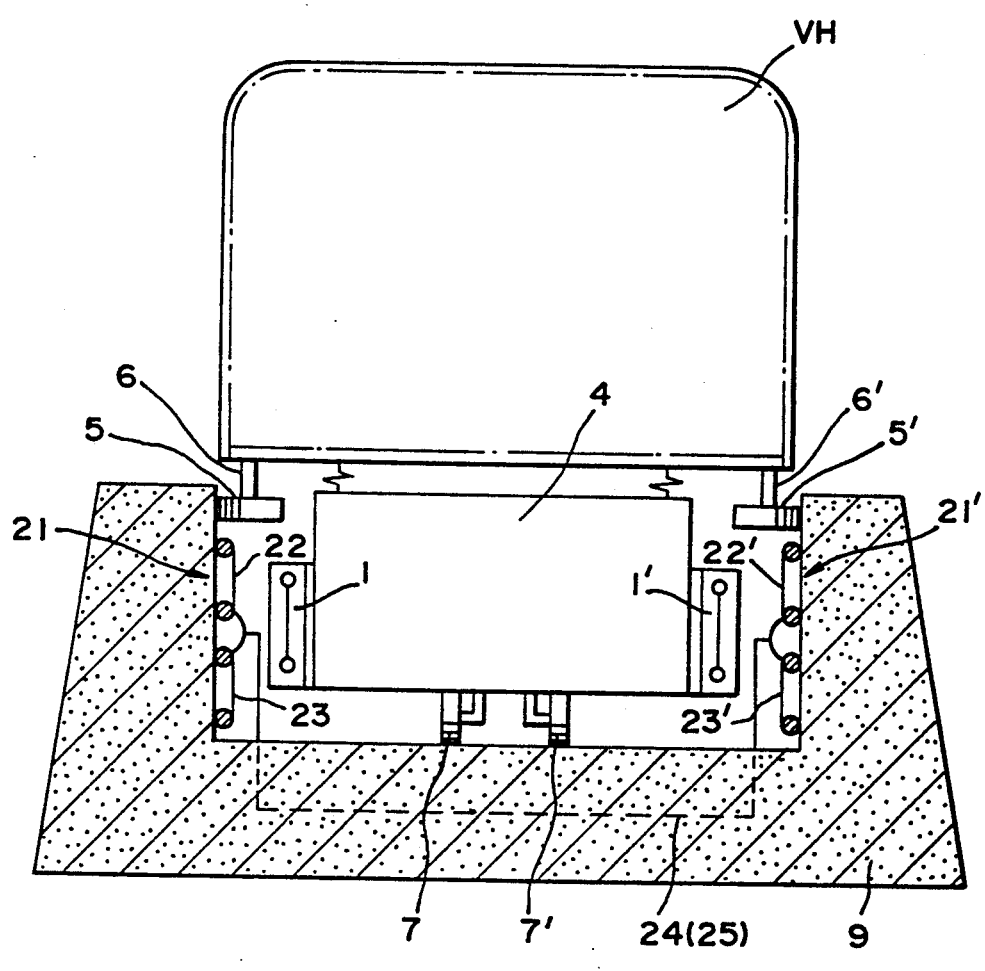
FIG. 5 is a sectional view showing a side-wall propulsion-levitation-guidance type magnetically levitated railway according to the prior art.
Figure 6A:
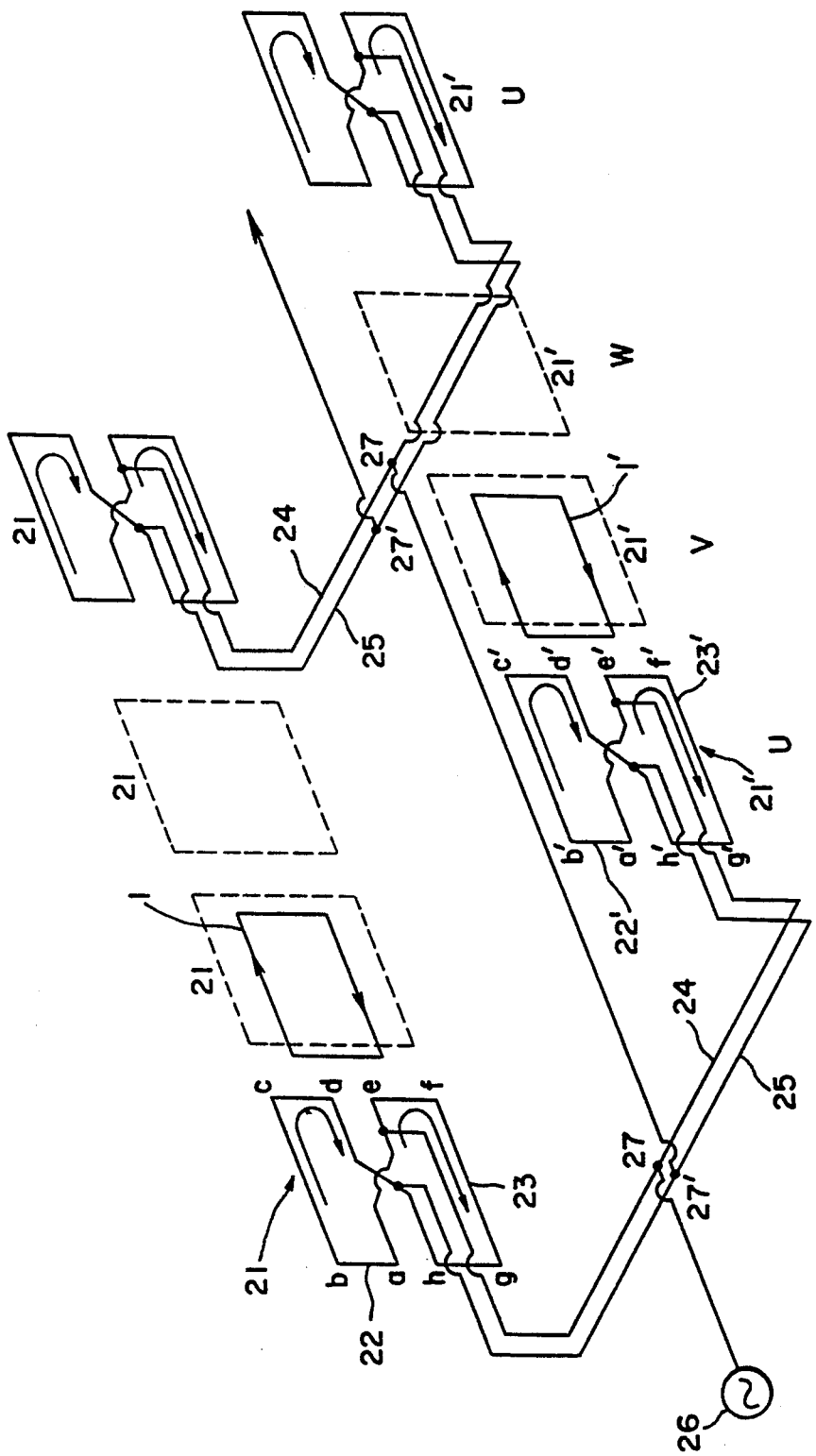
FIG. 6(a) is a circuit diagram showing the circuit arrangement of the conductor coils depicted in FIG. 5.
Figure 6B:
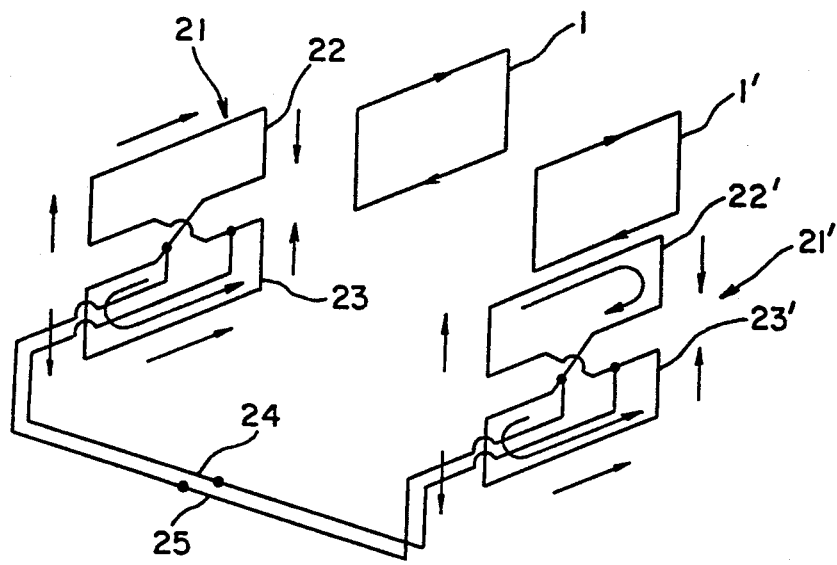
FIG. 6(b) is a circuit diagram for describing the levitating action of the conductor coils shown in FIG. 5.
Figure 6C:
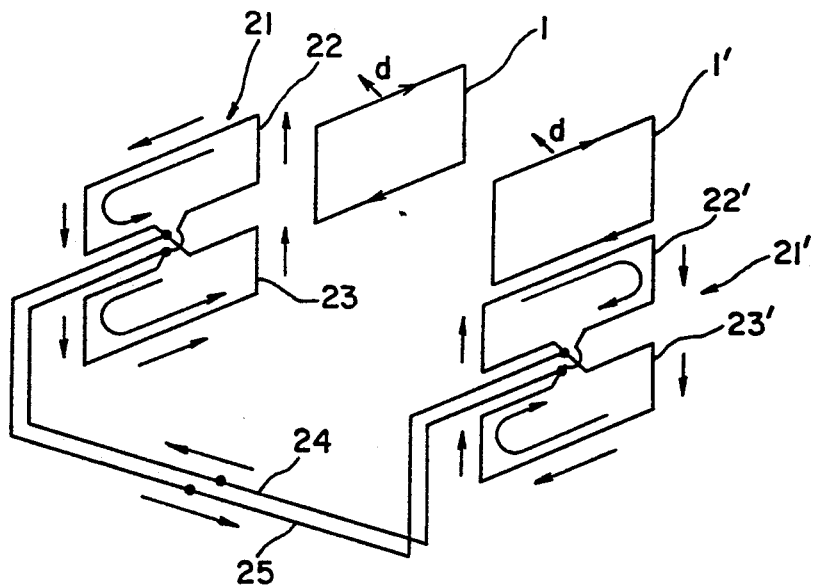
FIG. 6(c) is a circuit diagram for describing the guiding action of the conductor coils shown in FIG. 5.

Since a propulsion coil is installed separately of the coils for levitation and guidance, as illustrated in FIGS. 1 and 2 described above, the propulsive force is not tied to the coils for levitation and guidance.

As shown in FIG. 9, the upper coil 51 and lower coil 52 are arranged vertically and connected by a connecting line 70. The first and second lead terminals 57 and 58 are led from the coils to the outside.

Figure 8:
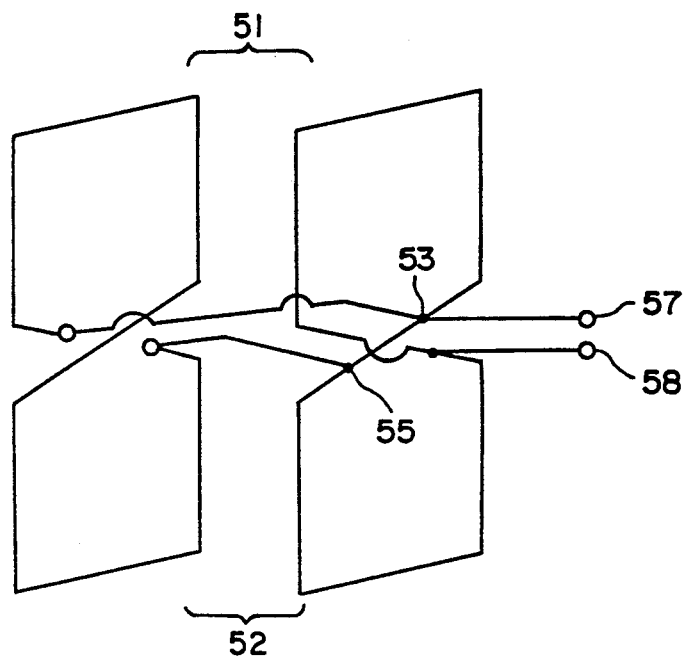
FIG. 8 is a schematic explanatory view showing a first embodiment of ground coils for a magnetically levitated railway according to the present invention.

Further, the upper coil 51 and lower coil 52 are connected as shown in FIG. 8. Here the upper coil 51 and lower coil 52 are depicted schematically. In actuality, the coils each consist of a plurality windings.

Figure 10:
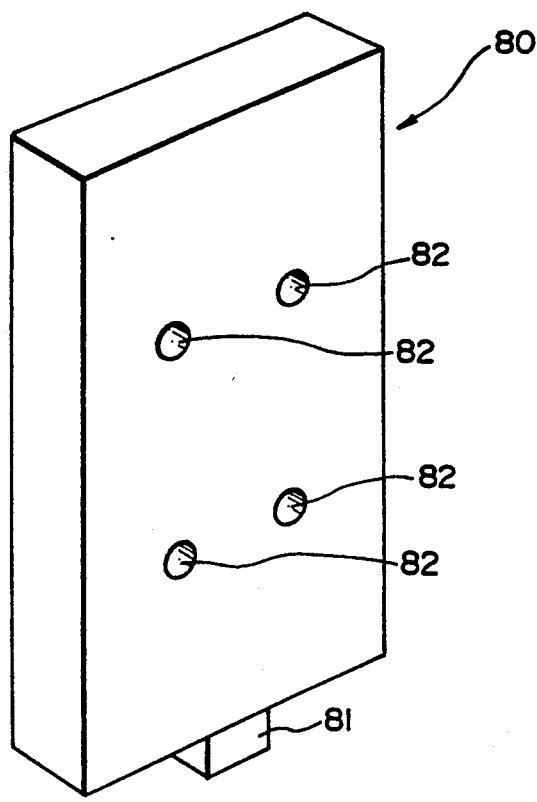
FIG. 10 is an external perspective view showing the first embodiment of ground coils for a magnetically levitated railway according to the present invention.

The upper coil 51 and lower coil 52 are molded of a sealing resin in the state shown in FIG. 9, and a panel-shaped molded resin body 80 is formed, as illustrated in FIG. 10. The lower end of the molded resin body 80 is provided with a terminal lead-out portion 81 through which the first lead terminal 57 and second lead terminal 58 are led out. The molded resin body 80 is mounted on the left and right side walls of the guideway by bolts (not shown) passed through mounting holes 82.

Figure 12:
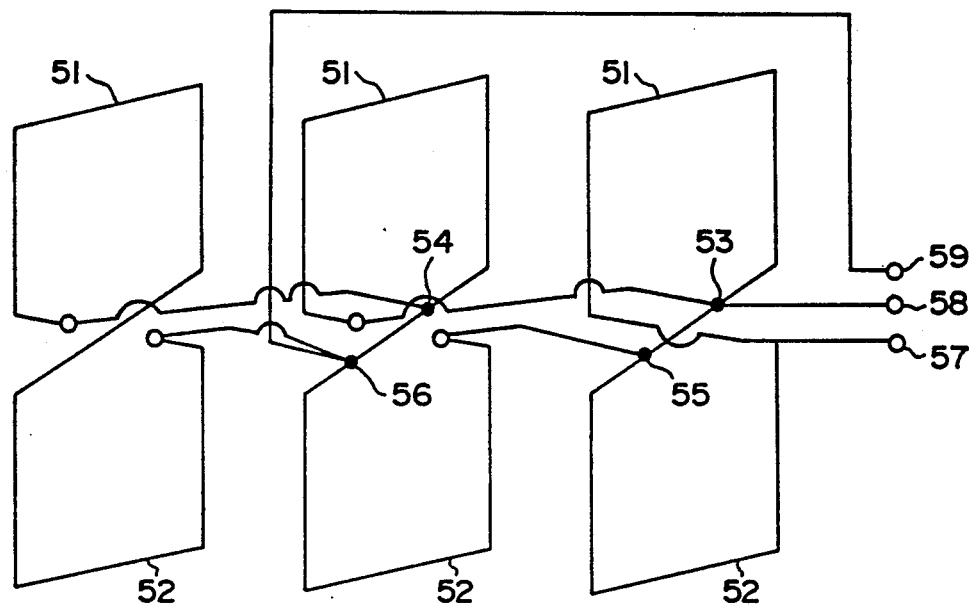
FIG. 12 is a theoretical explanatory view showing a second embodiment of ground coils for a magnetically levitated railway according to the present invention.

A second embodiment of the present invention will now be described with reference to FIGS. 12 and 13.

Figure 13:
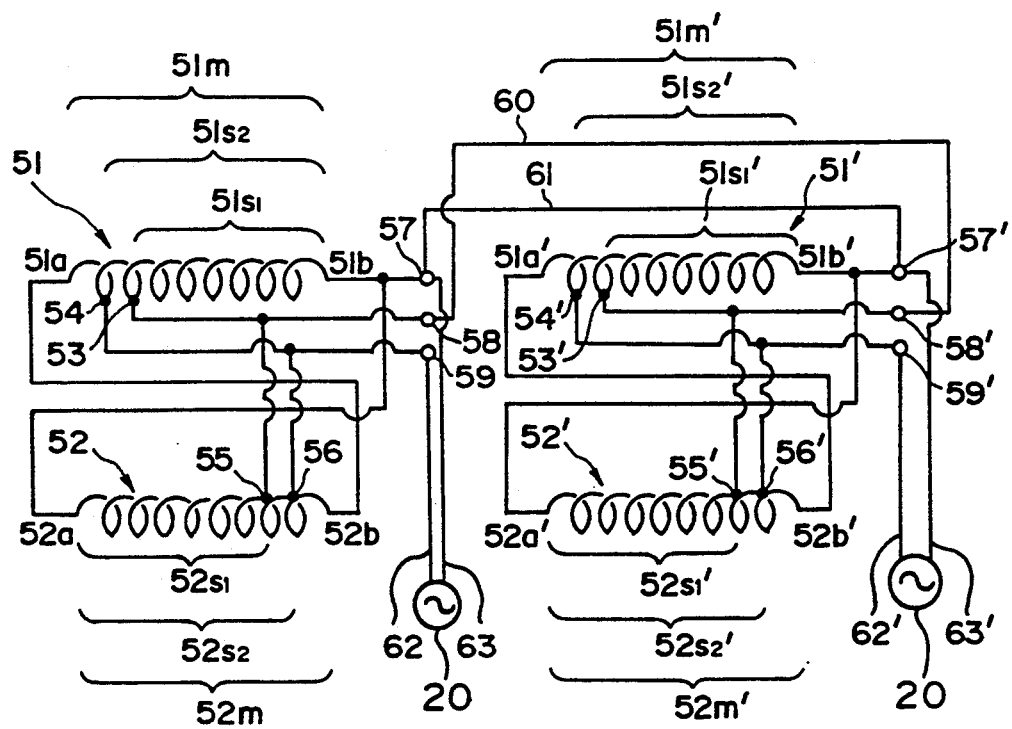
FIG. 13 is a circuit diagram of ground coils for a magnetically levitated railway according to the second embodiment of the present invention.

As shown in FIG. 13, a propulsive force is produced by currents which flow through parallel circuits on the side of one ground coil, namely a circuit consisting of a propulsion wiring line 62, a third lead terminal 59, a second intermediate terminal 54, a second shunt-winding portion $51s_2$, the other end portion 51b of the upper coil 51, the first lead terminal 57 and a propulsion wiring line 63, and a circuit consisting of the propulsion wiring line 62, the third lead terminal 59, a second intermediate terminal 56, a second shunt-winding portion $52s_2$, the other end portion 52a of the lower coil 52, the first lead terminal 57 and the propulsion wiring line 63.

Similarly, a propulsive force is produced by currents which flow through parallel circuits on the side of the opposing ground coil, namely a circuit consisting of propulsion wiring line 62', a third lead terminal 59', a second intermediate terminal 54', a second shunt-winding portion $51s_2'$, the other end portion 51b' of the upper coil 51', the first lead terminal 57' and a propulsion wiring line 63', and a circuit consisting of the propulsion wiring line 62', the third lead terminal 59', a second intermediate terminal 56', a second shunt-winding portion $52s_2'$, the other end portion 52a' of the lower coil 52', the first lead terminal 57' and the propulsion wiring line 63'.

A levitating force is produced by induction currents, which are induced by superconducting coils (not shown) mounted on the vehicle, in a closed circuit comprising one end portion 51a of the upper coil 51, the levitating main-winding portion 51m, the other end portion 51b of the upper coil 51, one end portion 52a of the lower coil 52, the levitating main-winding portion 52m and the other end portion 52b of the lower coil 52 on the side of one ground coil, and in a closed circuit comprising one end portion 51a' of the upper coil 51', the levitating main-winding portion 51m', the other end portion 51b' of the upper coil 51', one end portion 52a' of the lower coil 52', the levitating main-winding portion 52m' and the other end portion 52b' of the lower coil 52' on the side of opposing ground coil.

A guiding force is produced by induction currents generated in a closed circuit comprising the second lead terminal 58, the first intermediate terminal 53, a first shunt-winding portion $51s_1$, the other end 51b of the upper coil 51, the first lead terminal 57, the first null-flux wiring line 61, the first lead terminal 57', the other end portion 51b' of the upper coil 51', a first shunt-winding portion $51s_1'$, the first intermediate terminal 53', the second lead terminal 58', the second null-flux wiring line 60 and the second lead terminal 58, and in a closed circuit comprising the second lead terminal 58, the first intermediate terminal 55, the first shunt-winding portion $52s_1$, the other end 52a of the lower coil 52, the first lead terminal 57, the first null-flux wiring line 61, the first lead terminal 57', one end portion 52a' of the lower coil 52', the first shunt-winding portion $52s_1'$, the first intermediate terminal 55', the second lead terminal 58', the second null-flux wiring line 60 and the second lead terminal 58.

As described above, the levitating force is capable of using the total number of windings of the upper and lower coils, and therefore a strong levitating force can be obtained. The propulsive force, on the other hand, is taken out from the second intermediate terminal, so that the number of windings can be reduced. The force produced also is reduced correspondingly. The guiding force is taken out from the first intermediate terminal, so that the number of windings can be reduced. The force produced is reduced by a corresponding amount.

As a result, an arrangement can be realized in which the propulsive force and guiding force are suppressed even though the levitating force is increased.

A third embodiment of the present invention will now be described with reference to FIG. 14.

Figure 14:
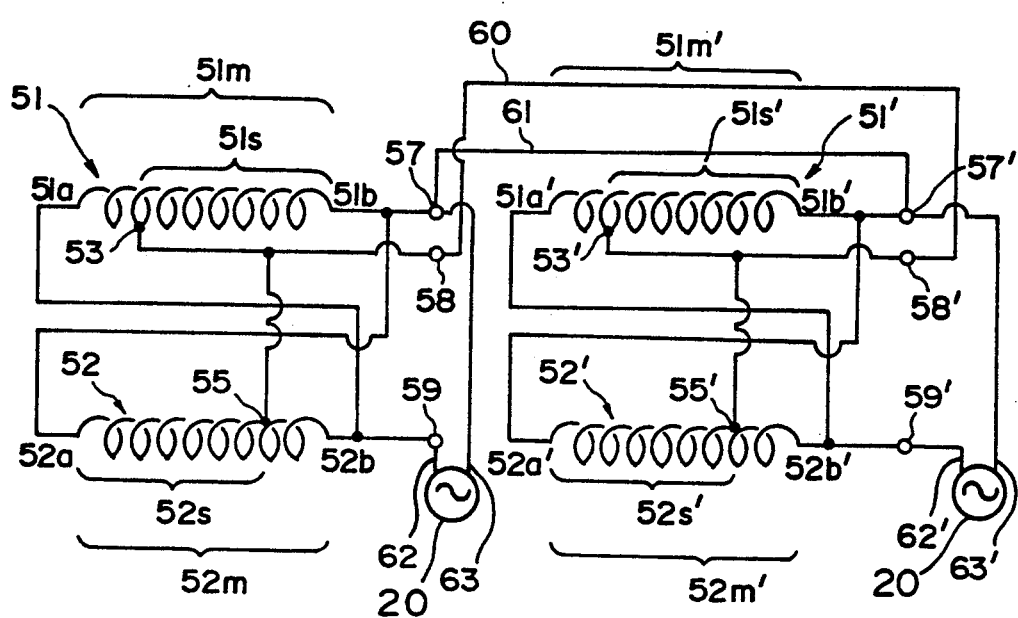
FIG. 14 is a circuit diagram of ground coils for a magnetically levitated railway according to a third embodiment of the present invention.

As shown in FIG. 14, a propulsive force is produced by currents which flow through parallel circuits on the side of one ground coil, namely a circuit consisting of the propulsion wiring line 62, the third lead terminal 59, one end portion 51a of the upper coil 51, the main-winding portion 51m, the other end portion 51b of the upper coil 51, the first lead terminal 57 and the propulsion wiring line 63, and a circuit consisting of the propulsion wiring line 62, the third lead terminal 59, the other end portion 52b of the lower coil 52, the main-winding portion 52m, the other end portion 52a of the lower coil 52, the first lead terminal 57 and the propulsion wiring line 63.

Similarly, a propulsive force is produced by currents which flow through parallel circuits on the side of the opposing ground coil, namely a circuit consisting of the propulsion wiring line 62', the third lead terminal 59', one end portion 51a' of the upper coil 51', the main-winding portion 51m', the other end portion 51b' of the upper coil 51', the first lead terminal 57' and a propulsion wiring line 63', and a circuit consisting of the propulsion wiring line 62, the third lead terminal 59', the other end portion 52b' of the lower coil 52', the main-winding portion 52m', the other end portion 52a' of the lower coil 52', the first lead terminal 57' and the propulsion wiring line 63'.

As in the second embodiment, a levitating force is produced by current induced by the main-winding portion 51m of the upper coil 51 and the main-winding portion 52m of the lower coil 52, and by a current induced by the main-winding portion 51m' of the upper coil 51' and the main-winding portion 52m' of the lower coil 52'.

Further, a guiding force is produced by induction currents generated in a closed circuit comprising the second lead terminal 58, the intermediate terminal 53, the shunt-winding portion 51s, the other end 51b of the upper coil 51, the first lead terminal 57, the first null-flux wiring line 61, the first lead terminal 57', the other end portion 51b' of the upper coil 51', the shunt-winding portion 51s', the intermediate terminal 53', the second lead terminal 58', the second null-flux wiring line 60 and the second lead terminal 58, and in a closed circuit comprising the second lead terminal 58, the intermediate terminal 55, the shunt-winding portion 52s, the other end 52a of the lower coil 52, the first lead terminal 57, the first null-flux wiring line 61, the first lead terminal 57', one end portion 52a' of the lower coil 52', the shunt-winding portion 52s', the intermediate coil 55', the second lead terminal 58', the second null-flux wiring line 60 and the second lead terminal 58.

As a result, an arrangement can be realized in which the guiding force can be suppressed even though the propulsive force and levitating force are increased.

A fourth embodiment of the present invention will now be described with reference to FIG. 15.

Figure 15:
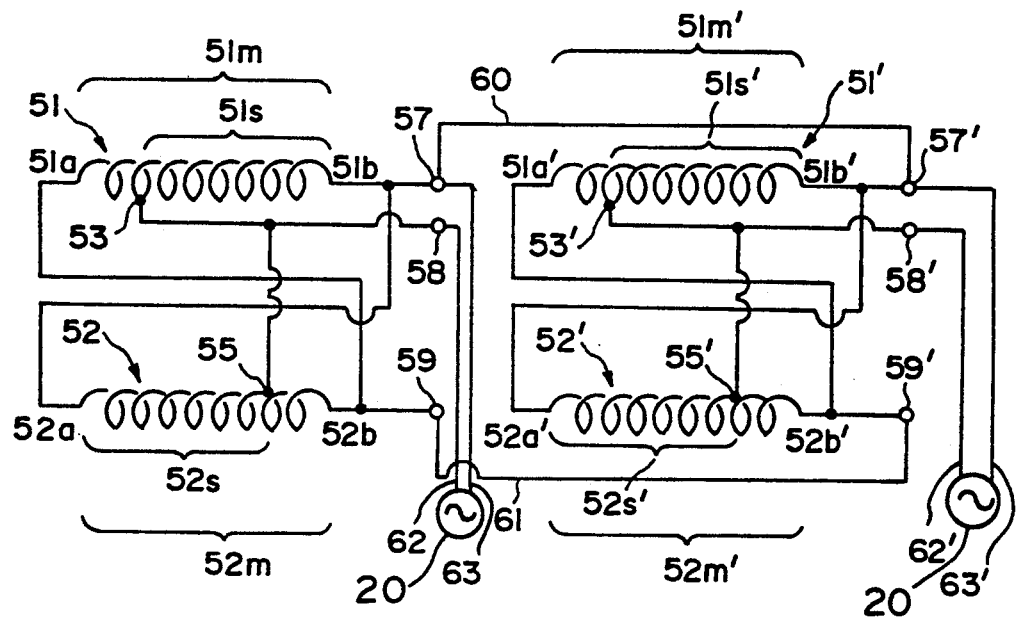
FIG. 15 is a circuit diagram of ground coils for a magnetically levitated railway according to a fourth embodiment of the present invention.

As shown in FIG. 15, a propulsive force is produced by induction currents which flow through parallel circuits on the side of one ground coil, namely a circuit consisting of the propulsion wiring line 62, the second lead terminal 58, the intermediate terminal 53, the shunt-winding portion 51s, the other end portion 51b of the upper coil 51, the first lead terminal 57 and the propulsion wiring line 63, and a circuit consisting of the propulsion wiring line 62, the second lead terminal 58, the intermediate terminal 55, the shunt-winding portion 52s, the end portion 52a of the lower coil 52, the first lead terminal 57 and the propulsion wiring line 63; and by currents which flow through parallel circuits on the side of the opposing ground coil, namely a circuit consisting of the propulsion wiring line 62', the second lead terminal 58', the intermediate terminal 53', the shunt-winding portion 51s', the other end portion 51b' of the upper coil 51', the first lead terminal 57' and the propulsion wiring line 63', and a circuit consisting of the propulsion wiring line 62', the second lead terminal 58', the intermediate terminal 55', the end portion 52a' of the lower coil 52', the first lead terminal 57' and the propulsion wiring line 63'.

As in the second and third embodiments, a levitating force is produced by current induced by the main-winding portion 51m of the upper coil 51 and the main-winding portion 52m of the lower coil 52, and by a current induced by the main-winding portion 51m' of the upper coil 51' and the main-winding portion 52m' of the lower coil 52'.

Further, a guiding force is produced by induction currents generated in a closed circuit comprising the third lead terminal 59, one end portion 51a of the upper coil 51, the main-winding portion 51m, the other end portion 51b of the upper coil 51, the first lead terminal 57, the second null-flux wiring line 60, the first lead terminal 57', the other end portion 51b' of the upper coil 51', the main-winding portion 51m', the end portion 51a' of the upper coil 51', the third lead terminal 59', the first null-flux wiring line 61 and the third lead terminal 59, and in a closed circuit comprising the third lead terminal 59, the other end 52b of the lower coil 52, the main-winding portion 52m, one end portion 52a of the lower coil 52, the first lead terminal 57, the second null-flux wiring line 60, the first lead terminal 57', the other end portion 52b' of the lower coil 52', the main-winding portion 52m', the end portion 52b' of the lower coil 52, the third lead terminal 59', the first null-flux wiring line 61 and the third lead terminal 59.

Thus, as set forth above, the number of coil windings for levitation and the number of coil windings for guidance use the total number of windings, and both are the same. On the other hand, since the propulsive force is taken out from the intermediate terminal, the number of coil windings for propulsion is reduced and so is the force generated.

As a result, the propulsive force can be suppressed even if the levitation force and guiding force are increased.

A fifth embodiment of the present invention will now be described with reference to FIG. 16.

Figure 16:
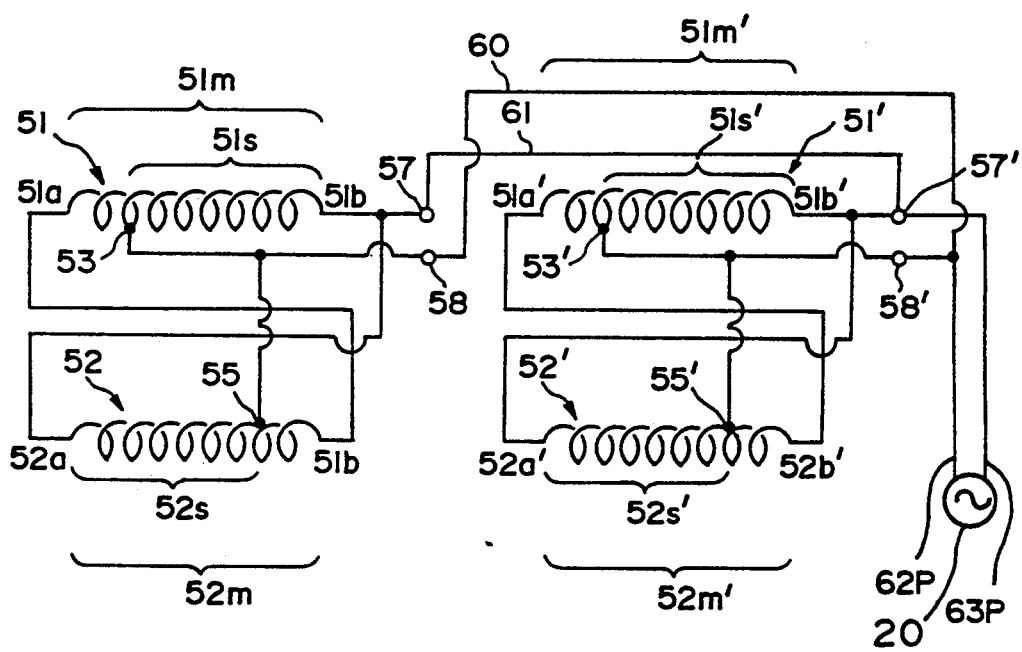
FIG. 16 is a circuit diagram of ground coils for a magnetically levitated railway according to a fifth embodiment of the present invention.
Figure 7:
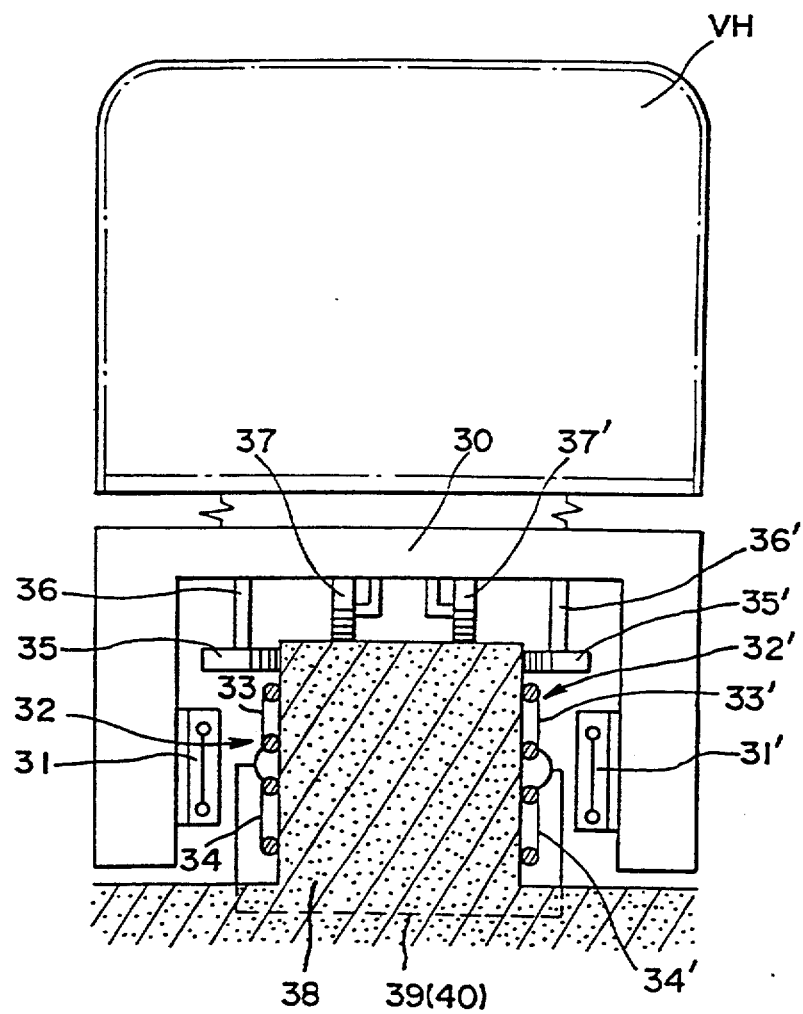

As shown in FIG. 16, a propulsive force is obtained by feeding current to opposing ground coils from propulsion wiring lines 62P, 63P provided on either side of the track bed.

More specifically, a propulsive force is produced by an induced current which flows through parallel circuits, namely a circuit consisting of the propulsion wiring line 62P, the second null-flux wiring line (in which a current for propulsion is superimposed) 60, the second lead terminal 58, the intermediate terminal 53, the shunt-winding portion 51s, the other end portion 51b of the upper coil 51, the first lead terminal 57, the first null-flux wiring line (in which a current for propulsion is superimposed) 61, the first lead terminal 57' and the propulsion wiring line 63P, and a circuit consisting of the propulsion wiring line 62P, the second null-flux wiring line 60, the second lead terminal 58, the intermediate terminal 55, the shunt-winding portion 52s, one end portion 52a of the lower coil 52, the first lead terminal 57, the first null-flux wiring line 61, the first lead terminal 57' and the propulsion wiring line 63P; and by an induced current which flows through parallel circuits, namely a circuit consisting of the propulsion wiring line 62P, the second lead terminal 58', the intermediate terminal 53', the shunt-winding portion 51s', the other end portion 51b' of the upper coil 51', the first lead terminal 57' and the propulsion winding line 63P, and a circuit consisting of the propulsion wiring line 62P, the second lead terminal 58', the intermediate terminal 55', the shunt-winding portion 52s', the other end portion 52a' of the lower coil 52', the first lead terminal 57' and the propulsion wiring line 63P.

A power supply 20 for propulsion is connected between the propulsion wiring lines 62P and 63P.

In this embodiment, as described above, the second null-flux wiring line 60 and the first null-flux wiring line 61 serve also as means for supplying the current for propulsion. In addition to the induced current for producing the guiding force, a current for propulsion is superimposed upon the null-flux wiring lines 60 and 61.

Thus, as set forth above, the number of coil windings for levitation uses the total number of windings. On the other hand, since the propulsive force and the guidance force are taken out from the intermediate terminal, the number of coil windings for propulsion and guidance is reduced and so is the force generated.

As a result, the propulsive force and the guidance force can be suppressed even if the levitation force is increased.

Thus, in the ground coil for the magnetically levitated railway according to the present invention, intermediate terminals are provided in such a manner that a guiding force or a propulsive force and the guiding force can be suppressed relative to a levitating force. Accordingly, by selecting and installing the above-described ground coil in dependence upon the traveling conditions of the track and the design of the vehicle, it is possible to provide a magnetically levitated railway in which smooth operation is feasible.

Since the above-described actions and effects can be obtained with a number of terminals identical with that of the prior art, a high-performance ground coil can be obtained without detracting from economy and maintenance.

As many apparently widely different embodiments of the present invention can be made without departing from the spirit and scope thereof, it is to be understood that the invention is not limited to the specific embodiments thereof except as defined in the appended claims.

What is claimed is:

1. Ground coils for a magnetically levitated railway in which superconducting coils are mounted on a vehicle and ground coils are arranged on left and right sides of a guideway for moving the vehicle by repulsion induced between the superconducting coils and the ground coils, wherein the ground coils are arranged in repeating units along the guideway, each unit comprising propulsion-levitation-guidance coils arranged on left and right sides of the guideway, said propulsion-levitation-guidance coils each comprising:
    (i) an upper coil having a levitation main-winding portion, a first intermediate terminal forming a guidance shunt-winding portion of said levitation main-winding portion, and a second intermediate terminal forming a propulsion shunt-winding portion of said levitation main-winding portion;
    (ii) a lower coil having a levitation main-winding portion, a first intermediate terminal forming a guidance shunt-winding portion of said levitation main-winding portion, and a second intermediate terminal forming a propulsion shunt-winding portion of said levitation main-winding portion, said upper coil and said lower coil being arranged one above the other and being null-flux connected at null-flex connection points;
    (iii) a first lead terminal connected to one of the null-flex connection points;
    (iv) a second lead terminal connected to the first intermediate terminal of said upper coil and the first intermediate terminal of said lower coil;
    (v) a third lead terminal connected to the second intermediate terminal of said upper coil and the second intermediate terminal of said lower coil;
    (vi) a first null-flux wiring line connecting the first lead terminals of the propulsion-levitation-guidance coils arranged on the left and right sides of the guideway;
    (vii) a second null-flux wiring line connecting the second lead terminals of the propulsion-levitation-guidance coils on the left and right sides of the guideway; and
    (viii) a propulsion wiring line led out individually from each of the first and third lead terminals on the left and right sides of the guideway, and connected to a propulsion power supply.

2. Ground coils for a magnetically levitated railway in which superconducting coils are mounted on a vehicle and ground coils are arranged on left and right sides of a guideway for moving the vehicle by repulsion induced between the superconducting coils and the ground coils, wherein the ground coils are arranged in repeating units along the guideway, each unit comprising:
    (a) means for (i) connecting said ground coils to a power source to provide propulsion of the vehicle along the guideway and (ii) interconnecting said ground coils on the left and right sides of the guideway to provide guidance of the vehicle along the guideway;
    (b) said ground coils including null-flex levitation coils arranged on the left and right sides of the guideway and comprising:
        (i) an upper coil having an upper levitation main-winding portion and an upper intermediate terminal defining an upper shunt-winding portion of the upper main-winding portion;
        (ii) a lower coil having a lower levitation main-winding portion and a lower intermediate terminal defining a lower shunt-winding portion of the lower main-winding portion;
        (iii) said upper coil and said lower coil being arranged one above the other and being null-flex connected at null-flux connection points to provide for levitation of the moving vehicle;
    (c) a first lead terminal connected to one null-flux connection point;
    (d) a second lead terminal connected to the intermediate terminals of said upper and lower coils; and
    (e) said first and second terminals being connected to said means.

* * * * *

UNITED STATES PATENT AND TRADEMARK OFFICE
CERTIFICATE OF CORRECTION

PATENT NO. : 5,293,824
DATED : August 2, 1994
INVENTOR(S) : Byung Taik Choi

It is certified that error appears in the above-indentified patent and that said Letters Patent is hereby corrected as shown below:

Col. 2, line 35, delete "vH" and insert --VH--.

Col. 8, line 3, delete "5".

Col. 13, line 46, "flex" should read --flux--; and line 48, "flex" should read --flux--.

UNITED STATES PATENT AND TRADEMARK OFFICE
CERTIFICATE OF CORRECTION

PATENT NO. : 5,293,824
DATED : March 15, 1994
INVENTOR(S) : Fujie et al

Figure 7:
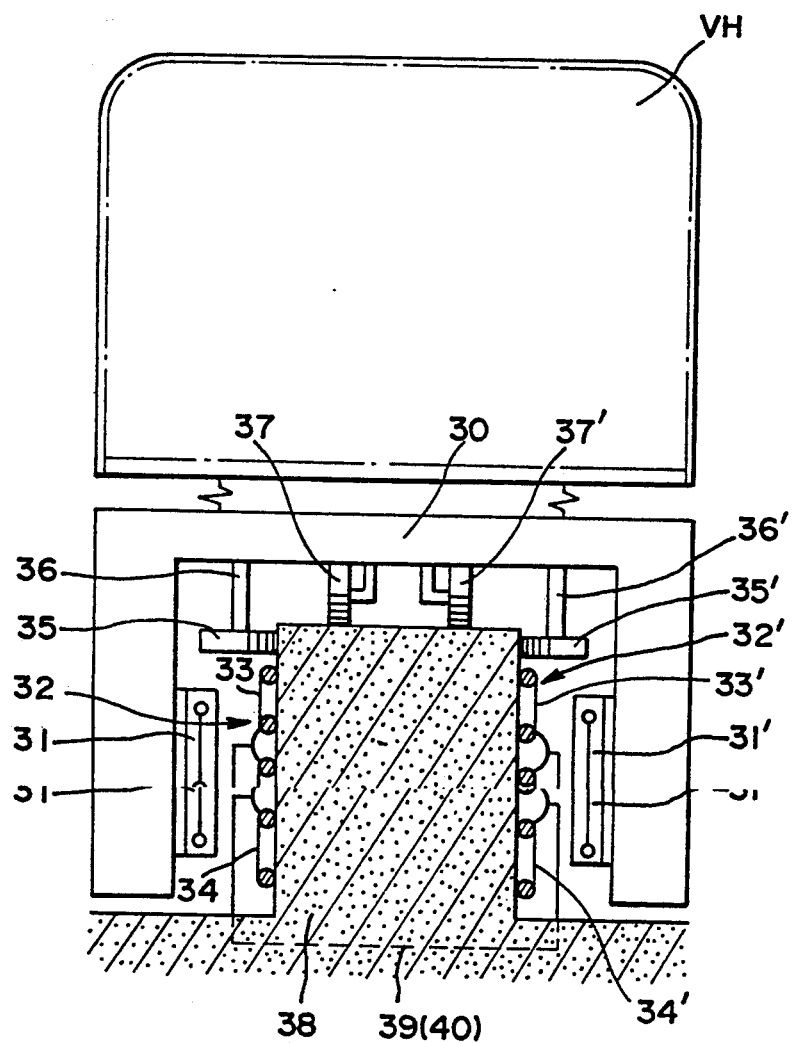
FIG. 7 is a sectional view showing a side-wall propulsion-levitation-guidance type magnetically levitated railway according to another example of the prior art.

It is certified that error appears in the above-indentified patent and that said Letters Patent is hereby corrected as shown below:

In the drawing sheet, consisting of Fig. 7, delete and replaced with Fig. 7, as shown on the attached page.

Signed and Sealed this

Eighth Day of November, 1994

Attest:

BRUCE LEHMAN

Attesting Officer

Commissioner of Patents and Trademarks